United States Patent Office 2,736,784
Patented Feb. 28, 1956

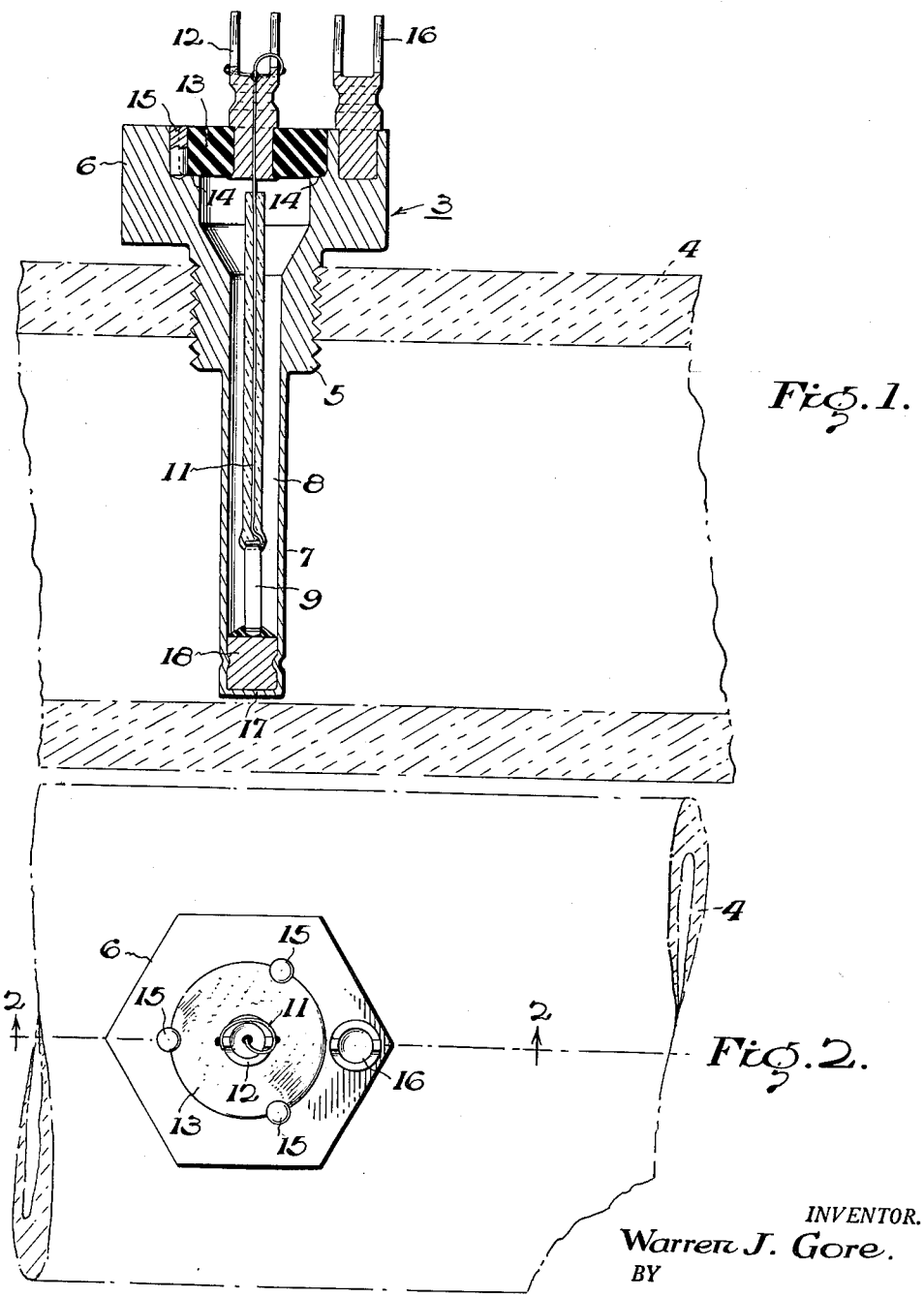

2,736,784

ELECTRIC PROBE

Warren J. Gore, Baltimore, Md., assignor to Bendix Aviation Corporation, Baltimore, Md., a corporation of Delaware Application June 1, 1953, Serial No. 358,730

3 Claims. (Cl. 201—63)

The present invention relates generally to improvements in condition responsive elements and in particular to improvements in said elements in the form of probes adapted to be attached or affixed to a container or enclosure such that the condition responsive element projects into the interior of such containers or enclosures to sense the conditions existing within.

One application of the type above to which the subject invention is ideally adapted, is in the measurement of liquid level by means of a ceramic conducting body having a substantially high negative temperature coefficient of resistance. Such an application is disclosed and claimed in the co-pending application of Franklin O. Wisman, Serial Number 215,261, filed March 13, 1951, and the subject invention discloses a probe construction ideally adapted for use in connection with the system shown in the aforesaid pending application.

As clearly set forth in the aforesaid co-pending application, the liquid level system described therein utilizes a ceramic conducting body carrying a flow of current sufficient to cause substantial self-heating of the body. Depending upon whether or not the ceramic body is submerged by the liquid, whose level it is desired to measure, the heat dissipation from the body will vary and this variation will cause a substantial change in resistance, thus providing a substantial electrical effect which can be readily availed of to detect the changes taking place in the body of liquid. In some applications it is desirable to enclose the ceramic body within a protective shell and it is this particular application to which the subject invention pertains.

In attempting to perfect a shell that can be used with a ceramic body in the manner described above, it has been found that considerable difficulty is experienced in properly affixing the ceramic body within the shell. Bearing in mind the fact that the shell surrounding the ceramic body should be as close as possible to the body to promote maximum heat transfer between the body and the liquid surrounding the shell, and further realizing that ceramic bodies utilized for this type of application normally have a diameter on the order of one-tenth of one inch, it can be appreciated that the units in question are relatively small and the matter of properly positioning the ceramic body within the shell and affixing it thereto is complicated, for there must be good electrical contact between the ceramic body and one portion of the shell and at the same time there must be sufficient spacing between the body and the shell to provide proper electrical insulation for the return flow of the current which normally passes through the shell. In other words, the shell constitutes one electrical lead to the ceramic body and therefore must be insulated from the body, except at the point of connection thereto, and there must also be sufficient space within the shell to permit connection of an electrical lead to provide the other path for the current flow through the ceramic body. Efforts to connect the ceramic body directly to the shell have not met with noteworthy success in that the usual methods of accomplishing such a result resulted in very unstable and unpredictable conditions of electrical contact between the ceramic body and the shell. For example, one method of connecting the two parts together would be to simply solder the two parts together. However, this is difficult in view of the fact that such soldering must be done within the confines of a relatively small space and within an enclosure that cannot be seen by the one attempting to assemble the parts together.

It is therefore an object of the present invention to provide simple and effective means by which a ceramic body can be properly assembled within a protective shell.

It is a further object of the invention to provide simple and effective means by which a ceramic body can be properly assembled within a protective shell in such a way that the body can be electrically connected to the shell under highly stabilized and controlled contact conditions.

It is another object of the invention to accomplish the aforementioned objects by means that will enhance the heat transfer capabilities of the assembled unit.

Still further objects and advantages of the present invention will be apparent upon reference to the detailed specification set forth below, when taken in conjunction with the drawings annexed hereto, in which:

Figure 1 is a sectional view in elevation taken along the lines 2—2 of Figure 2 and showing the improved construction covered by the subject invention, and Figure 2 is an end view of the device shown in Figure 1.

Referring first to Figure 1, there is shown a probe generally indicated by 3, suitably attached to an enclosure in the form of pipe 4 by means of the threaded shank 5, cooperating with a threaded aperture in the pipe. The shank 5 extends outwardly from an enlarged head 6 and projecting outwardly from the shank 5 on the end opposite the head is the tubular member 7. A suitable recess 8 is provided within the tubular member 7, the shank 5, and the head 6 for receiving therein the ceramic conducting body 9 and its associated electric lead wire 11. In the illustrated embodiment the tubular member, shank and head are formed as an integral unit from suitable metallic stock.

The ceramic body is in the form of a thin rod having terminals at opposite ends thereof, suitably applied by means of conventional plating, metal spraying or metallizing techniques. The ceramic body is that type of a conducting body known as a thermistor, possessing a substantially high negative temperature coefficient of resistance and comprising a combination of sintered metallic oxides suitably intermixed and in proper proportions to give the desired characteristics. The lead wire 11 is suitably insulated and has one end thereof connected to ceramic body 9 by means of soldering or the like so that a good electrical connection therebetween is achieved. This lead wire 11 is brought out through a terminal 12 and affixed thereto by any convenient means, such as soldering, the terminal 12 being carried by an insulating member 13 forming a portion of the enlarged head 6. In the embodiment illustrated it is seen that the insulating member 13 is in the form of a cylindrical member which is press-fit into a suitable aperture in the head, resting against the shoulders 14, and being securely locked in place by means of the mechanical stakes 15. Offset from the terminal 12 and suitably affixed, by a press-fit or the like, to the conducting portion of head 6 is another terminal 16, the terminals 12 and 16 being adapted for suitable connection to an external electrical circuit.

Heretofore it has been the practice to assemble the ceramic body 9 directly to the wall 17 forming the closed end of tubular member 7. The manner of performing this assembly was to insert a suitable quantity of solder in the probe, heat up the probe, pass the ceramic body 9 and its associated lead wire 11 into the probe and down into the tubular member 7 until the end of the ceramic body 9 contacted the molten solder, and thence hold momentarily in this position until the solder solidified and held the parts in place. Ordinarily the over-all diameter of the tubular member 7 is on the order of several tenths of inches, the inner diameter in the embodiment shown being on the order of .152 inch for a ceramic body and its associated lead having an over-all diameter of .10 inch. With such small dimensional limitations of the various parts making up the assembled probe, it is difficult to properly assemble the ceramic body in place, maintaining spacing at all times between the body and the side walls of the tubular member 7 and at the same time so positioning the ceramic body that good electrical contact is established through the soldered joint at the closed wall of the tubular member 7. Further complicating the situation is the fact that residue (such as dirt, chips and oil) from the machining operations performed on the probe is difficult to clean out from the inner extremity of recess 8, thereby preventing attainment of good soldered joints. Ordinarily, such an assembly is difficult to make without having an imperfect electrical contact between the ceramic body and the tubular member 7, resulting in a high rejection rate during manufacture and a consequent high cost of manufacture.

To overcome the aforementioned difficulty it has been found that if the ceramic body 9 is first soldered to a plug and then the assembly of the ceramic body and plug inserted into the probe, reproduceability and interchangeability of elements is materially improved. Thus, there is shown such an arrangement in Figure 1, wherein the end of the ceramic body is rigidly secured to a plug 18 and is in electrical contact therewith. Ordinarily, soldering techniques can be utilized to achieve a bond between the two parts. The plug 18 is shown in the form of a cylindrical member having a length equal to its cross-sectional diameter and slidably engaging the inner walls of the tubular member 7. Once the ceramic body and its associated lead wire 11 are properly assembled to plug 18, it is a simple matter to slip this sub-assembly into the recess of the probe and slide it along until the plug contacts the end wall 17. Since the ceramic body is accurately positioned onto the plug 18, centrally disposed thereof and extended at right angles thereto, it is obvious that the ceramic body will be automatically positioned with respect to the side walls of the tubular member 7. Moreover, uniform and reproduceable electrical contact can be established between the ceramic body and the plug because the joining or bonding of the two can be done in the open where the operation can be observed, inspected and tested prior to assembly into the probe. Moreover, in the event of failure of the unit in the field, it is a simple matter to remove the insulating cover 13 and pull out the ceramic body and its associated plug to thereby replace it with a good sub-assembly and thus restore the probe to an operating condition.

Ordinarily, the parts so assembled will stay in their proper position within the probe, but in the event that positive means is desired to locate the plug in its proper position within the tubular member 7, the plug can be provided with a slight groove or indentation so that the side walls of the tubular member 7 surrounding the plug can be rolled into the indentation or groove to thereby lock the parts together.

It is important to note that the plug 18 has a relatively substantial mass, that is, its length should at least be equal to its cross-sectional radius. This insures a sufficiently rugged assembly and at the same time provides a relatively large contact area between the plug and its surrounding shell to insure sufficient contact between the two parts for proper current flow therebetween. Moreover, by making the length at least equal to the cross-sectional radius, the heat conducting path from the ceramic body to the shell, via the plug, is never any shorter, in any direction, than the minimum length established by the inner diameter of the tubular member 7. In the embodiment shown, the length of the plug approximates its cross-sectional diameter to give added ruggedness to the unit, to further facilitate the assembly of the parts, and to provide a large contacting interface between the plug and the surrounding walls of member 7.

It has been found that the selection of the material used for the plug 18 and the related parts of the probe 3 bears a significant relation to the successful and accurate operation of the probe as a sensing element. First of all, it is to be remembered that the ceramic body 9 at all times operates in a self-heated condition, that is to say, sufficient current flows through the ceramic body to raise its temperature to a value on the order of 325–350 degrees Fahrenheit. If the pipe 4 has liquid therein surrounding the tubular member 7, the presence of this liquid will serve to readily dissipate the heat generated by the ceramic body 9 and thus maintain its temperature at a substantially constant level. If for any reason there is no liquid in the pipe 4, the heat generated by the ceramic body will not be dissipated as rapidly as when the probe is surrounded by liquid so that the body will further self-heat and change its resistance materially to influence the operation of an external circuit connected thereto. To attain any degree of speed and accuracy for such a device, it is important that the construction be such that rapid heat transfer exists between the ceramic body and its surrounding shell. However, the heat transfer between the ceramic body and the shell, by means of direct contact thereto, through plug 18, must not be so great that the heat generated by the ceramic body will be conducted away from the body to the outer parts of the probe, otherwise the accuracy of the device will be seriously impaired. It has been found that stainless steel is an excellent metal to use for the tubular member 7 and the plug 18, for stainless steel has the poorest thermal conducting properties of any metals available for this application, thus minimizing the conduction of heat through the plug and walls of member 7 to the outer parts of the probe.

Moreover, since the ceramic body 9 is surrounded by a jacket of insulation in the form of air in the recess 8, it is highly important that the material selected for the tubular member 7 possess a high degree of emissivity. Since conduction and convection through the insulating air is relatively poor, the transfer of heat from the ceramic body to the surrounding metal wall of the tubular member 7 must primarily be means of radiation. Stainless steel has been found to have the highest degree of emissivity than any of the other materials normally available for this application, and the combination of relatively poor thermal conductivity and high emissivity makes stainless steel ideally adapted for use as the material for tubular member 7 and plug 18.

With the above arrangement of parts in mind, it is apparent that an improved condition responsive probe has been provided by the subject invention, one that is simple to assemble, and disassemble if necessary; one that can be easily adapted for use in connection with almost any form of container or enclosure; one that possesses mechanical strength, excellent electrical conducting properties, and excellent heat transfer capabilities.

Moreover, the use of stainless steel throughout for the metallic parts of the assembly prevents, to a maximum degree, the possiblity of the heat generated by the ceramic body being conducted away from the probe through the body of the probe and its external head rather than to the fluid surrounding the probe. Additionally, maximum heat transfer occurs between the ceramic body and its surrounding shell of stainless steel because of the high degree of emissivity of the stainless steel.

What is claimed and desired to be secured by United States Letters Patent is:

1. An improved condition-responsive probe, comprising: an elongated tubular member made of stainless steel and having at least one closed end, a cylindrical stainless steel plug enclosed in said tubular member in contact therewith in proximity to said closed end, said plug having a length at least equal to its cross-sectional radius, a ceramic conducting body in the form of a rod axially positioned in said tubular member and having one end thereof rigidly affixed to said plug in electrical contact therewith, said body comprising a resistor having a substantially high negative temperature coefficient of resistance, an insulated electrical lead projected into said tubular member and connected to the other end of said resistor, said plug to facilitate assembly being adapted for initial sliding engagement with the inner surface of said tubular member whereby said plug, said resistor and said lead can be assembled together as a unit prior to insertion in said tubular member, an enlarged head provided with a threaded shank connected to said tubular member opposite the closed end thereof, said head and shank being axially recessed to provide a continuation of the interior of said tubular member, a non-conducting element located in said head and closing off said recess, a first electric terminal supported by said non-conducting element and connected to said electric lead and a second electric terminal supported by the conducting portion of said enlarged head, said conducting portion of said head, said shank, said tubular member and said plug forming a return electrical path from said resistor.

2. An improved condition-responsive probe, comprising: an elongated metallic tube having its one end closed and its opposite end open, an enlarged head having a shank to which the open end of the tube is connected, said head and shank being axially recessed to provide a continuation of the interior of said tube, a non-conducting element positioned in said head and closing off said recess, an input electrical terminal connected to said element, a metallic plug positioned in the closed end of the tube, a ceramic conducting body in the form of a relatively thin rod axially positioned in said tube in spaced relation to the adjacent surrounding wall of the tube and having its one end rigidly affixed to said plug in electric contact therewith, said body comprising a resistor having a substantially high negative temperature coefficient of resistance, an insulated electrical lead connecting the opposite end of said rod to said input terminal, said head, said shank, said tubular member and said plug forming a return path from said resistor, said plug to facilitate assembly being adapted for initial sliding engagement with the inner surface of said tubular member whereby said plug, said resistor and its coacting lead can be assembled together as a unit prior to insertion in said tubular member, said plug having a relatively large area in contact with said tube.

3. A probe as claimed in claim 2, wherein said plug is cylindrical in shape and has a length at least equal to its cross-sectional radius.

References Cited in the file of this patent

UNITED STATES PATENTS

| | | |
|---|---|---|
| 2,526,251 | Medlar | Oct. 17, 1950 |
| 2,528,243 | Quinn | Oct. 31, 1950 |
| 2,616,949 | Cade | Nov. 4, 1952 |